Patented June 17, 1930

1,764,888

UNITED STATES PATENT OFFICE

WALTER P. RALEIGH, OF AMES, IOWA, ASSIGNOR TO PITTSBURGH PLATE GLASS COMPANY, A CORPORATION OF PENNSYLVANIA

ART OF DISINFECTING SEEDS

No Drawing. Application filed April 26, 1928. Serial No. 273,162.

The present invention relates to improvements in the art of disinfecting corn or like seeds and to the treated seed products. While the present invention is particularly applicable to seed corn, in preventing attack by certain known and general parasites as *Diplodia zeac*, *Basisporium gallarum* and *Giberella sanbinetii*, it is not limited thereto, as it may be employed in treating seeds subject to attack by dry rots and surface-born fungi.

In carrying out the present invention, I apply to the seeds to be treated or disinfected an adherent finely pulverized material or dust, comprising, if desired, an inert material such as graphite, talc or other siliceous material and an insoluble addition product of hexamethylenetetramine and a mercurial salt. The addition product of hexamethylenetetramine and mercurial salt, in the case of mercuric chloride, for example, may be produced by bringing the two materials together in aqueous solution in the proportions of approximately 2 molecules of mercuric chloride to one molecule of hexamethylenetetramine. Thus, 542 parts of mercuric chloride dissolved in 2000 parts of water are added to 140 parts of hexamethylenetetramine in 5000 parts of water with vigorous stirring, resulting in the precipitation of approximately 680 parts of the desired product.

The precipitated addition compound of mercuric chloride and hexamethylenetetramine is separated, suitably by filtration, dried, finely powdered and may be mixed with the desired proportion of a suitable inert material. It is readily apparent, however, that the inert material may be present in the reaction mixture during the reaction, being kept in suspension by vigorous agitation, in which case the addition compound will be deposited superficially upon the particles of inert material as it is precipitated. Or a proportion of the desired quantity of inert material may be so present in the course of the reaction, thus producing a composition of inert material and the addition product which is more concentrated in the latter than the desired material, and additional inert material may be admixed with this concentrated composition to secure the desired concentration of the active addition compound.

The term "addition compound" is employed herein for convenience in description of the active material and it is not intended to imply or to limit the scope of this application to the theory that the precipitates thus formed by reaction between hexamethylenetetramine and soluble mercury salts are necessarily of the chemical character of addition compounds. In forming effective addition compounds of this type other soluble mercury compounds may be employed; for example, nitrates, acetates and the like. Furthermore, the relative proportions of the mercury compound and hexamethylenetetramine may be widely varied.

The addition compounds of hexamethylenetetramine and mercury salts referred to herein are effective when present in composition in proportions to provide 2.5% mercury or higher. In general, I prefer to employ them in proportions sufficient to give 2½ to 10% mercury in the composition. Very substantially higher proportions may be employed, up to 100% concentration of the addition compounds without appreciable injury to the seeds to which the composition is applied.

The inert material may be any finely powdered, adherent inactive insoluble substance, such as finely divided silicia, kieselguhr, silicates, such as chalk, graphite or the like. Different inert constituents may be admixed if desired. The use of graphite for part or all of the inert material is particularly advantageous, by reason of the lubricating effect it has upon the planting machinery in which the treated seed is used.

The composition is applied by dusting it on the seeds in any desired proportion, it being found that ordinarily about 2 ounces is consumed per bushel of seed.

I claim:

1. The herein described process of disinfecting corn and like seeds consisting in dusting the same with finely divided particles containing an insoluble addition product of hexamethylenetetramine and a mercurial salt.

2. The herein described process of disinfecting corn and like seeds comprising dusting the same with finely divided particles of inert carrier admixed with an insoluble addition product of hexamethylenetetramine and mercurial salt.

3. The herein described process of disinfecting corn and like seeds consisting in applying superficially thereto finely divided particles of an addition compound of hexamethylenetetramine and mercuric chloride.

4. The herein described process of disinfecting corn and like seeds consisting in applying superficially thereto an inert carrier carrying at least 2½% of an addition compound of hexamethylenetetramine and a mercurial salt.

5. The herein described process of disinfecting corn and like seeds consisting in applying superficially thereto finely divided particles of inert carrier including graphite and an addition compound of hexamethylenetetramine and a mercurial salt.

6. The herein described finely pulverized disinfectant for corn and like seeds comprising an inert carrier and an addition product of hexamethylenetetramine and a mercurial salt.

7. The herein described finely pulverized disinfectant for corn and like seeds containing an inert carrier and an addition product of hexamethylenetetramine and mercuric chloride in proportion to supply at least 2.5% of mercury.

8. The herein described finely powdered disinfectant for corn and like seeds consisting of an inert carrier and an addition compound of hexamethylenetetramine and mercuric chloride in proportion to supply 3.5 to 10% mercury.

9. Seeds having a surface coating of an insoluble addition product of hexamethylenetetramine and a mercury salt.

10. Seeds having a surface coating of an insoluble addition product of hexamethylenetetramine and mercuric chloride.

11. Seeds having a surface coating of an inert carrier intermingled with addition product of hexamethylenetetramine and a mercury salt.

12. Seeds having a surface coating of an inert material including graphite intermingled with an addition product of hexamethylenetetramine and a mercury compound.

In testimony whereof I have hereunto set my hand this 21st day of April, 1928.

WALTER P. RALEIGH.